(12) United States Patent
Han et al.

(10) Patent No.: US 11,474,008 B2
(45) Date of Patent: Oct. 18, 2022

(54) EXHAUST GAS DILUTION DEVICE

(71) Applicant: Korea Institute of Machinery & Materials, Daejeon (KR)

(72) Inventors: Bangwoo Han, Daejeon (KR); Chang Gyu Woo, Daejeon (KR); Hak Joon Kim, Daejeon (KR); Yong-Jin Kim, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 17/258,979

(22) PCT Filed: Jun. 25, 2019

(86) PCT No.: PCT/KR2019/007673
§ 371 (c)(1),
(2) Date: Jan. 8, 2021

(87) PCT Pub. No.: WO2020/013483
PCT Pub. Date: Jan. 16, 2020

(65) Prior Publication Data
US 2021/0278325 A1    Sep. 9, 2021

(30) Foreign Application Priority Data

Jul. 10, 2018   (KR) ........................ 10-2018-0079757

(51) Int. Cl.
*G01N 1/38*    (2006.01)
*G01N 1/22*    (2006.01)

(52) U.S. Cl.
CPC ............. *G01N 1/38* (2013.01); *G01N 1/2247* (2013.01); *G01N 2001/2244* (2013.01); *G01N 2001/2264* (2013.01)

(58) Field of Classification Search
CPC ................... G01N 1/38; G01N 1/2247; G01N 2001/2244; G01N 2001/2264
See application file for complete search history.

(56) References Cited

U.S. PATENT DOCUMENTS

| 6,928,890 B2 | 8/2005 | Gehner et al. |
| 2010/0284006 A1 * | 11/2010 | Socha ............... B01D 46/4263 356/388 |

FOREIGN PATENT DOCUMENTS

| GB | 2445230 A * | 7/2008 | .......... G01N 1/2252 |
| JP | 2010-085412 A | 4/2010 | |

(Continued)

OTHER PUBLICATIONS

International Search Report for International Application No. PCT/KR2019/007673 dated Oct. 18, 2019.

(Continued)

*Primary Examiner* — David Z Huang
(74) *Attorney, Agent, or Firm* — Harness, Dickey & Pierce, P.L.C.

(57) ABSTRACT

An exhaust gas dilution device according to an exemplary embodiment of the present invention includes a head part, ejector unit, a nozzle part, and a dilution part. The head part has a space part into which an exhaust gas flows and a through-hole formed through the center axis direction to be connected to the space part. The ejector unit is coupled to the head part and has a first discharge hole formed passing through the center axis direction to be connected to the through-hole and connected to a first inlet to which primary dilution air is supplied. The nozzle part is inserted into a first discharge hole through the through-hole and has a second discharge hole that penetrates in the center axis direction so that the exhaust gas flowed into the space part is sucked and ejected into the first discharge hole as the primary dilution air moves through the first discharge hole. The dilution part (Continued)

has a first flow path part into which a primary dilution gas, which is generated and discharged after the exhaust gas and the primary dilution air are mixed in the first discharge hole, flows, and a second flow path part connected to the first flow path part and guiding secondary dilution air to be mixed with the primary dilution gas, and generates a secondary dilution gas as the primary dilution gas and the secondary dilution air are mixed.

9 Claims, 10 Drawing Sheets

(56) References Cited

FOREIGN PATENT DOCUMENTS

| JP | 2010-107304 A | 5/2010 |
|---|---|---|
| JP | 5174041 B2 | 4/2013 |
| JP | 5249051 B2 | 7/2013 |
| KR | 10-2016-0116673 A | 10/2016 |
| KR | 101793982 B1 | 11/2017 |

OTHER PUBLICATIONS

Written Opinion for International Application No. PCT/KR2019/007673 dated Oct. 18, 2019.

* cited by examiner

EXHAUST GAS DILUTION DEVICE

CROSS-REFERENCE TO RELATED APPLICATIONS

This application is a national phase under 35 U.S.C. § 371 of PCT International Application No. PCT/KR2019/007673 which has an International filing date of Jun. 25, 2019, which claims priority to Korean Application No. 10-2018-0079757, filed Jul. 10, 2018, the entire contents of each of which are hereby incorporated by reference.

TECHNICAL FIELD

The present invention relates to an exhaust gas dilution device. More particularly, the present invention relates to an exhaust gas dilution device that may increase measurement precision.

BACKGROUND ART

When a concentration of sampled particles exceeds a measurement range of a particle counter, a particle dilution device as a device for measuring even high concentration sampling particles by being installed at the front end of the particle counter, diluting the sampled particles at a certain dilution ratio, and transferring them to the particle counter is used.

In general, the particle dilution device includes a mixing chamber in which a gas to be measured is flowed and firstly mixed with dilution air to generate a first dilution gas, and an ejector with which dilution air is secondarily mixed with the first dilution gas and transmitted to the particle counter.

However, in such a conventional particle dilution device, a problem may occur in measurement accuracy because there are many particles that are lost due to adhesion of the particles to be measured to the inner surface of the mixing chamber. In other words, the particle counter measures the particle concentration of the diluted gas and converts the concentration of the particle to be measured based on this, and in this case, if loss of the particles occurs in the mixing chamber, there is a state that the number of the particles included in the dilution gas supplied to the particle counter is already small, so the concentration of the particles converted based on this has a difference from the concentration of the particles to be actually measured.

Also, since a large amount of the dilution gas diluted in the mixing chamber must be sucked through the ejector, a large amount of high-pressure air is required for the ejector. Therefore, there is a problem that a configuration of a compressor for supplying air to the ejector at high pressure must be added.

DISCLOSURE

Technical Problem

One aspect of the present invention is to provide an exhaust gas dilution device that may increase measurement precision.

The technical object aimed to be achieved by the present invention is not limited to the foregoing technical object, and other non-mentioned technical objects may be clearly understood by those skilled in the art from the description below.

Technical Solution

An exemplary embodiment of the present invention provides an exhaust gas dilution device including: a head part having a space part into which an exhaust gas flows and a through-hole formed passing through a center axis direction to be connected to the space part; an ejector unit coupled to the head part and having a first discharge hole formed passing through the center axis direction to be connected to the through-hole and connected to a first inlet to which primary dilution air is supplied; a nozzle part inserted into the first discharge hole through the through-hole and having a second discharge hole formed through the center axis direction so that the exhaust gas flowed into the space part is sucked in and ejected into the first discharge hole as the primary dilution air is moved through the first discharge hole; and a dilution part having a first flow path part into which a primary dilution gas, which is generated and discharged after the exhaust gas and the primary dilution air are mixed in the first discharge hole, flows and a second flow path part connected to the first flow path part and guiding secondary dilution air to be mixed with the primary dilution gas, and generating a secondary dilution gas as the primary dilution gas and the secondary dilution air are mixed.

In an exemplary embodiment of the present invention, the first discharge hole may have a suction part formed on the rear end of the ejector unit and connected to the first inlet and an acceleration part formed on the front end of the suction part and a diffusion part formed on the front end of the acceleration part, and the nozzle part may have a flange part coupled to the inner surface of the space part, a connection part connected to the flange part and provided on the through-hole and the inside of the suction part, and a nozzle tip part formed on the front end of the connection part and inserted into the acceleration part and having an exterior diameter corresponding to the interior diameter of the acceleration part.

In an exemplary embodiment of the present invention, the nozzle tip part may have a first discharge flow path on an external circumferential surface so that the primary dilution air flowed into the suction part is discharged to the diffusion part.

In an exemplary embodiment of the present invention, the first discharge flow path may be formed in a spiral.

In an exemplary embodiment of the present invention, the first discharge flow path may be formed in the axis direction of the nozzle tip part and disposed in plural with a predetermined interval along the circumferential direction of the nozzle tip part.

In an exemplary embodiment of the present invention, the acceleration part may have a second discharge flow path on the interior circumference so that the primary dilution air flowed into the suction part is discharged to the diffusion part.

In an exemplary embodiment of the present invention, the second discharge flow path may be formed in a spiral.

In an exemplary embodiment of the present invention, the second discharge flow path may be formed in the axis direction of the acceleration part and disposed in plural with a predetermined interval along the circumferential direction of the acceleration part.

In an exemplary embodiment of the present invention, the primary dilution air may be supplied with a temperature of 150° C. to 250° C. so that the primary dilution gas is generated by a high temperature dilution method, and the secondary dilution air may be supplied with a temperature of 10° C. to 30° C. so that the secondary dilution gas is generated by a room temperature dilution method.

In an exemplary embodiment of the present invention, in the first flow path part, a plurality of through holes may be formed to pass through the secondary dilution air.

Advantageous Effects

According to an exemplary embodiment of the present invention, effective decompression may be achieved in the diffusion part by the primary dilution air moving at high speed through the first discharge flow path, and accordingly, since the exhaust gas may be smoothly moved through the nozzle part, there is an advantage that compressed air to move the exhaust gas is unnecessary.

In addition, according to an exemplary embodiment of the present invention, since the secondary dilution air flows into the center direction of the first flow path part by the through hole formed in the first flow path part, the number of particles of the exhaust gas adhered to the interior circumference of the first flow path part may be reduced. In addition, when the secondary dilution air flows into the inside of the first flow path part through the through hole, the exhaust gas particles adhered to the interior circumference of the first flow path part may come off. Accordingly, it is possible to effectively reduce an occurrence of a particle loss while the exhaust gas becomes the secondary dilution gas.

In addition, according to an exemplary embodiment of the present invention, the exhaust gas is primarily diluted in the ejector unit and secondarily diluted in the dilution part, thereby increasing a dilution ratio.

Further, according to an exemplary embodiment of the present invention, the exhaust gas is mixed with the primary dilution air of a high temperature to be diluted at a high temperature, and thereafter is mixed with the secondary dilution air at room temperature to be diluted at room temperature, and accordingly, moisture in the exhaust gas may be prevented from condensing into liquid, thereby measurement accuracy of particles may be improved.

The effects of the present invention are not limited to the foregoing effects, and it shall be understood that the effect of the present invention includes all of the effects inferable from the detailed description of the present invention or the configuration of the invention described in the claims.

MODE FOR INVENTION

Figure 1:
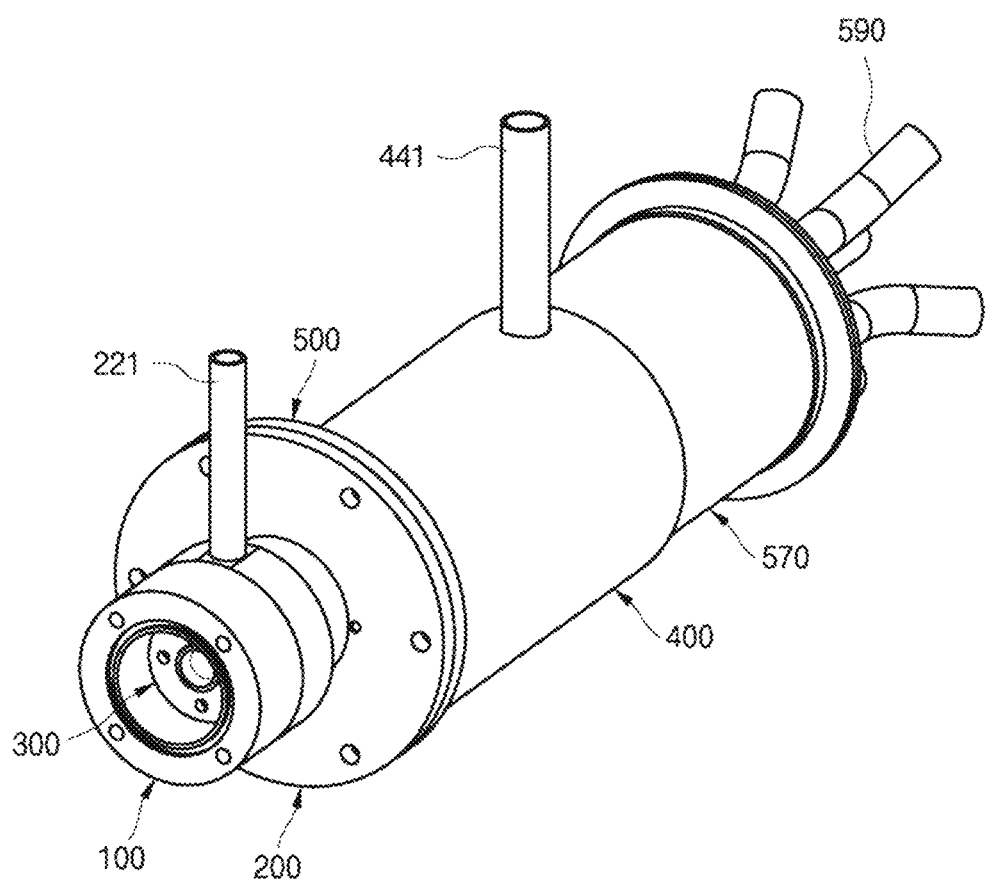
FIG. 1 is a perspective view of an exhaust gas dilution device according to a first exemplary embodiment of the present invention.

Hereinafter, the present invention will be described with reference to the accompanying drawings. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

Throughout the specification, when it is described that a part is "connected (in contact with, coupled)" to another part, the part may be "directly connected" to the other element or "connected" to the other part through a third part. Unless explicitly described to the contrary, the word "comprise" and variations such as "comprises" or "comprising" will be understood to imply the inclusion of stated elements but not the exclusion of any other elements.

Further, terms used in the present specification are used for simply explaining a specific exemplary embodiment, and are not intended to limit the present invention. A singular expression includes a plural expression unless it is specifically described to the contrary in the context. It will be appreciated that terms "including" and "having" are intended to designate the existence of characteristics, numbers, steps, operations, constituent elements, and components described in the specification, or a combination thereof, and do not exclude a possibility of the existence or addition of one or more other characteristics, numbers, steps, operations, constituent elements, components, or a combination thereof in advance.

Hereinafter, exemplary embodiments of the present invention will be described in detail with reference to the accompanying drawings.

Figure 2:
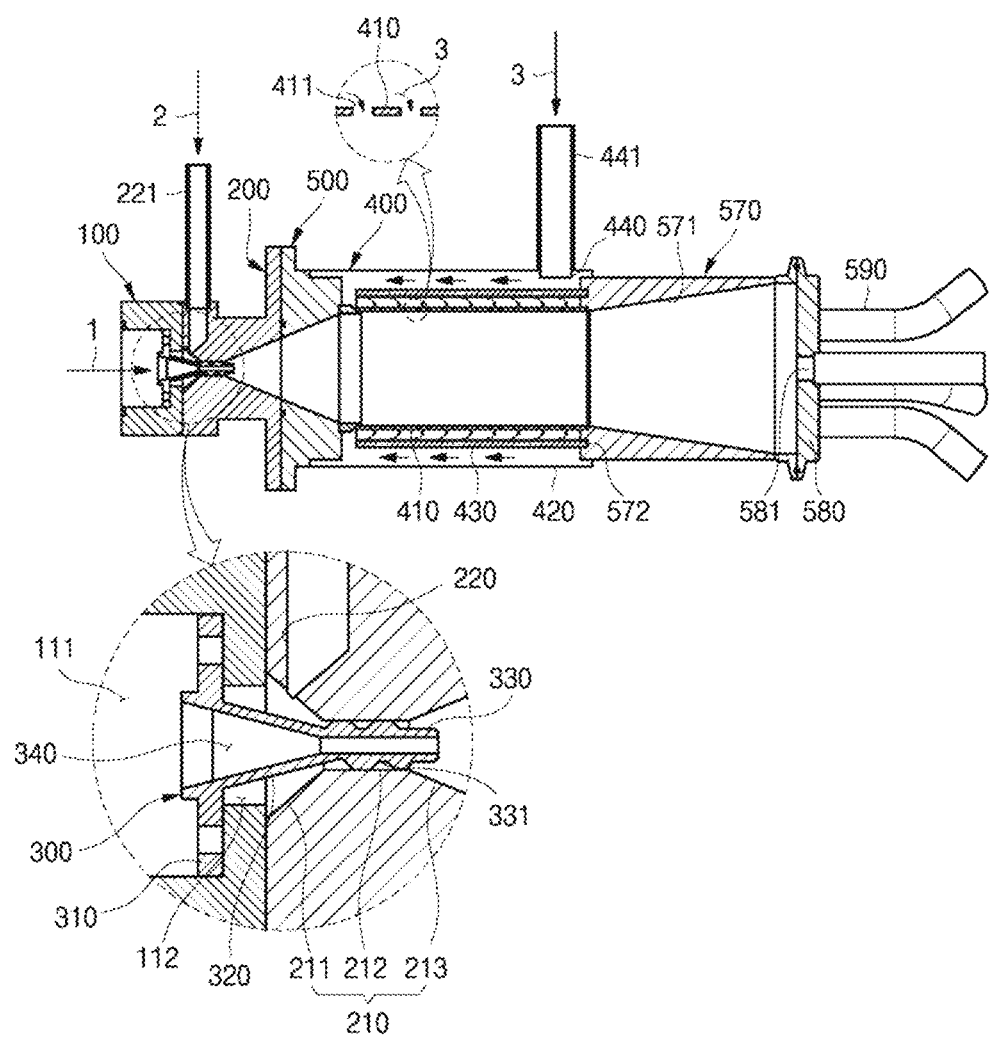
FIG. 2 is a cross-sectional view of an exhaust gas dilution device according to a first exemplary embodiment of the present invention.
Figure 3:
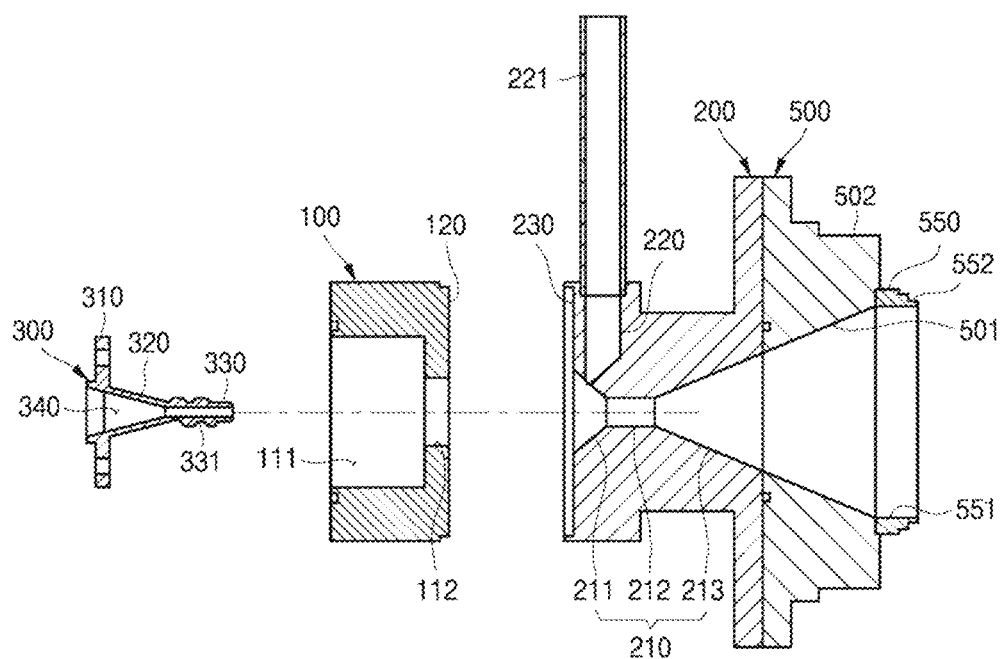
FIG. 3 is an exploded sectional view centrally showing a nozzle part of an exhaust gas dilution device according to a first exemplary embodiment of the present invention.

FIG. 1 is a perspective view of an exhaust gas dilution device according to a first exemplary embodiment of the present invention, FIG. 2 is a cross-sectional view of an exhaust gas dilution device according to a first exemplary embodiment of the present invention, and FIG. 3 is an exploded sectional view centrally showing a nozzle part of an exhaust gas dilution device according to a first exemplary embodiment of the present invention.

As shown in FIG. 1 to FIG. 3, an exhaust gas dilution device may include a head part 100, an ejector unit 200, a nozzle part 300, and a dilution part 400.

The head part 100 may have a space part 111 into which an exhaust gas 1 is flowed and a through-hole 112 formed passing through a center axis direction to be connected to the space part 111.

Also, the ejector unit 200 is coupled to the head part 100 and may have a first discharge hole 210 formed passing through the center axis direction to be connected to the through-hole 112 and connected to a first inlet 220 guiding a supplied primary dilution air 2.

Also, the nozzle part 300 is inserted into the first discharge hole 210 through the through-hole 112 and may have a second discharge hole 340 formed passing through the center axis direction so that the exhaust gas 1 flowed into the space part 111 is sucked and ejected into the first discharge hole 210 as the primary dilution air 2 moves through the first discharge hole 210.

Also, the dilution part 400 may have a first flow path part 410 into which a primary dilution gas, which is generated and discharged after the exhaust gas 1 and the primary dilution air 2 are mixed in the first discharge hole 210, flows and a second flow path part 420 connected to the first flow path part 410 and guiding a supplied secondary dilution air 3 to be mixed with the primary dilution gas. In the dilution part 400, the primary dilution gas and the secondary dilution air 3 may be mixed to generate the secondary dilution gas. Also, the secondary dilution gas generated in this way may be supplied to a particle counter (not shown).

In detail, the head part 100 may have the space part 111 into which the exhaust gas 1 flows and the through-hole 112 formed passing through the center axis direction to connected to the space part 111.

Hereinafter, for convenience of description, a front end/a front end part/a front, a rear end/a rear end part/a rear are defined based on the flow direction of the exhaust gas. That is, when the exhaust gas moves from the first point to the second point, the first point is defined as the rear end/the rear end part/the rear and the second point as the front end/the front end part/the front.

Accordingly, the through-hole 112 may be formed on the front end of the head part 100.

In addition, a step protrusion 120 may be formed in the front end part of the head part 100. The step protrusion 120 may be formed along the circumferential direction.

In addition, a cover (not shown) to close and seal the space part 111 may be provided at the rear end of the head part 100, and the exhaust gas may flow into the space part 111 through the cover.

In the present invention, the exhaust gas may be an example of a measurement object, and the measurement object is not necessarily limited to the exhaust gas. For example, when the measurement target is smoke of a chimney, a flow path in which a part of the smoke is absorbed may be provided in the chimney, and the smoke moving through the flow path may be supplied to the space part 111 of the head part 100 through the cover.

In addition, a heater (not shown) may be further provided at the rear end of the head part 100. The heater may heat the exhaust gas supplied to the space part 111. The exhaust gas may be heated to a temperature of 150° C. to 250° C. by the heater.

The ejector unit 200 can be coupled to the front end part of the head part 100.

A first step groove 230 may be formed at the rear end of the ejector unit 200, and the step protrusion 120 of the head part 100 may be inserted into the first step groove 230, thereby the head part 100 and the ejector unit 200 may be combined to have the same center as each other.

The ejector unit 200 may have a first discharge hole 210 formed passing through the center axis direction. In addition, the first discharge hole 210 may have a suction part 211, an acceleration part 212, and a diffusion part 213.

The suction part 211 may be formed at the rear end of the ejector unit 200, and the interior diameter thereof may decrease toward the front.

The acceleration part 212 is formed at the front end of the suction part 211 and may be connected to the suction part 211. The acceleration part 212 may be configured to have a constant interior diameter.

The diffusion part 213 is formed at the front end of the acceleration part 212 and may be connected to the acceleration part 212. The diffusion part 213 may be formed such that the interior diameter increases toward the front.

In addition, the ejector unit 200 may have a first inlet 220. The first inlet 220 may be formed passing through in a radial direction and may be connected to the suction part 211.

The first inlet 220 may guide the externally supplied primary dilution air 2 to the suction part 211. A first pipe 221 that guides the inflow of the primary dilution air 2 from the outside may be coupled to the first inlet 220.

The primary dilution air may be air of a high temperature, and the primary dilution air may be supplied at a temperature of 150° C. to 250° C.

The nozzle part 300 may have a flange part 310, a connection part 320, and a nozzle tip part 330.

The flange part 310 maybe coupled to the inner surface of the space part 111. The flange part 310 may be coupled to the head part 100 by a fastening member such as a bolt, and may be attached/detached to and from the head part 100.

The connection part 320 may be connected to the flange part 310 and formed to be extended to the front. The connection part 320 may penetrate the through-hole 112 of the head part 100 and extend to the front of the head part 100, and may be provided at the inside of the suction part 211. The connection part 320 may be formed to have a smaller diameter toward the front direction.

The nozzle tip part 330 may be formed at the front end of the connection part 320 and may be inserted into the acceleration part 212. The nozzle tip part 330 may have an exterior diameter of a size corresponding to the interior diameter of the acceleration part 212.

In addition, the nozzle part 300 may have a second discharge hole 340, and the second discharge hole 340 may be formed passing through the nozzle part 300 in the center axis direction. Among the second discharge hole 340, a portion formed in the connection part 320 may be formed such that the interior diameter decreases toward the front, and a portion formed in the nozzle tip part 330 may be formed with a constant interior diameter.

In addition, the nozzle tip part 330 may have a first discharge flow path 331 on the external circumferential surface. The first discharge flow path 331 may be formed in a spirally recessed form (a spirally concave grooved form) in the external circumferential surface of the nozzle tip part 330 (referring to FIG. 5). Accordingly, when the nozzle tip part 330 is inserted into the acceleration part 212, the suction part 211 and the diffusion part 213 may be connected by the first discharge flow path 331.

The primary dilution air 2 supplied through the first inlet 220 may be flowed into the suction part 211 and may be moved to the diffusion part 213 through the first discharge flow path 331. As the primary dilution air passes through the first discharge flow path 331 of a small cross-section, the flow rate increases, and when the primary dilution air is discharged to the diffusion part 213, the speed is reduced and the pressure decreases. Then, a pressure difference between the diffusion part 213 and the space part 111 occurs, and the exhaust gas of the space part 111 flows into the second discharge hole 340 and moves, and is supplied to the diffusion part 213. Since the primary dilution air moving through the first discharge flow path 331 generates turbulence in the diffusion part 213 and centrifugal force may be induced, the pressure of the rear end of the diffusion part 213 may be lowered more effectively.

The angle and interval of the first discharge flow path 331 may be adjusted, and through this, the flow amount and pressure of the primary dilution air can be controlled.

If the center axis of the nozzle tip part 330 does not coincide with the center axis of the acceleration part 212, the gap cross-section between the nozzle tip part 330 and the acceleration part 212 varies depending on the position and the flow amount of the primary dilution air passing through it also varies, and effective decompression may not be achieved in the rear end of the diffusion part 213. Then, the movement of the exhaust gas through the second discharge hole 340 may not be stable.

However, in the present invention, since the exterior diameter of the nozzle tip part 330 is formed to correspond to the interior diameter of the acceleration part 212 and the nozzle tip part 330 is closely inserted into the acceleration part 212, the nozzle tip part 330 may be positioned on the same center axis as the acceleration part 212. Therefore, the flow amount of the primary dilution air is the same at any position between the nozzle tip part 330 and the acceleration part 212, and the effective decompression is achieved in the diffusion part 213, so that the exhaust gas may be stably moved through the second discharge hole 340. Also, according to this, since the movement of the exhaust gas may be made smoothly due to the effective decompression formed in the diffusion part 213, there is an advantage that compressed air for moving the exhaust gas is unnecessary.

The exhaust gas dilution device may further include a first adapter unit 500 and a second adapter unit 550.

The first adapter unit 500 may be coupled to the front end of the ejector unit 200.

In the first adapter unit 500, an extended diffusion part 501 may be formed passing through the axis direction.

The extended diffusion part 501 may be formed such that the interior diameter increases toward the front direction, and may be formed to be continuous with the diffusion part 213 of the ejector unit 200.

The first adapter unit 500 may have a second step groove 502 on the external circumferential surface of the front end part.

Also, the second adapter unit 550 may be coupled to the front end of the first adapter unit 500.

The second adapter unit 550 may have a flow path hole 551 penetrating through the axis direction, and the flow path hole 551 may be connected to the extended diffusion part 501 of the first adapter unit 500.

The primary dilution gas generated by mixing the primary dilution air flowed into the first inlet 220 and the exhaust gas supplied through the second discharge hole 340 in the diffusion part 213 may be transferred through the extended diffusion part 501 and the flow path hole 551.

The second adapter unit 550 may have a third step groove 552 on the external circumferential surface of the front end part.

The dilution part 400 may be coupled to the front end of the second adapter unit 550.

The dilution part 400 may have a first flow path part 410 and a second flow path part 420.

In the first flow path part 410, the rear end part may be coupled to the third step groove 552 of the second adapter unit 550. The first flow path part 410 may be formed to be continuous in the flow path hole 551 of the second adapter unit 550, and the primary dilution gas generated in the diffusion part 213 may be moved to the first flow path part 410.

A plurality of through holes 411 may be formed through the first flow path part 410.

The second flow path part 420 may be provided to surround the first flow path part 410 outside of the first flow path part 410. The rear end part of the second flow path part 420 may be coupled to the second step groove 502 of the first adapter unit 500.

A second inlet 440 may be formed in the second flow path part 420, and the second inlet 440 may be formed on the front end part of the external circumferential surface of the second flow path part 420. The secondary dilution air 3 may be flowed through the second inlet 440, and a second pipe 441 guiding the secondary dilution air from the outside may be connected to the second inlet 440.

In addition, the dilution part 400 may have a guide wall 430.

The guide wall 430 may be provided between the first flow path part 410 and the second flow path part 420.

In addition, in the guide wall 430, the rear end part may be spaced apart from the front end part of the first adapter unit 500. Through this, the space between the first flow path part 410 and the second flow path part 420 may be partitioned mostly by the guide wall 430, and the flow length of the secondary dilution air flowed in through the second inlet 440 may be lengthened. That is, the secondary dilution air flowed in through the second inlet 440 may be moved in the rear direction in the space between the second flow path part 420 and be moved to the space between the path part 410 and the guide wall 430 the guide wall 430 through the space between the guide wall 430 and the first adapter unit 500. Then, it is moved to the inside of the first flow path part 410 through the through hole 411 and is mixed with the primary dilution gas, thereby generating a secondary dilution gas.

In the first flow path part 410, a plurality of through holes 411 are formed as a whole, so that an area of the external circumferential surface of the first flow path part 410 is reduced. Therefore, among the exhaust gas particles of the primary dilution gas, the number of particles that are adhered to the interior circumference of the first flow path part 410 may be reduced, and thus exhaust gas particle loss may be reduced.

In addition, when the secondary dilution air flows into the center direction of the first flow path part 410 through the through hole 411, the exhaust gas particles adhered to the interior circumference of the first flow path part 410 may come off. Accordingly, most of the particles in the exhaust gas moving in the first flow path part 410 may be mixed with the secondary dilution air, and the occurrence of the particle loss may be effectively reduced while the exhaust gas becomes the secondary dilution gas.

The exhaust gas dilution device may include a diffusion tube part 570, a plug part 580, and a discharge tube 590.

The diffusion tube part 570 may be coupled to the front end of the dilution part 400.

The diffusion tube part 570 may have a coupling groove 572 in the rear end part. The coupling groove 572 may be formed in a circumferential direction, and the front end part of the guide wall 430 may be inserted into and coupled to the coupling groove 572. In addition, the rear end part of the diffusion tube part 570 may be inserted into and coupled to the inside of the second flow path part 420.

The diffusion tube part 570 may have an additional diffusion part 571 that is formed through the axis direction. The additional diffusion part 571 may be formed to increase the interior diameter toward the front direction, and the secondary dilution gas generated in the dilution part 400 may be moved to the additional diffusion part 571.

The plug part 580 may be coupled to the front end part of the diffusion tube part 570. The plug part 580 may close and seal the front end part of the diffusion tube part 570.

The discharge tube 590 may be coupled to the plug part 580. A plurality of discharge tubes 590 may be coupled. A connection hole 581 may be formed through the plug part 580 so that the discharge tube 590 is coupled, and the secondary dilution gas of the additional diffusion part 571 may be moved to the discharge tube 590 through the connection hole 581. A particle counter (not shown) may be connected to the discharge tube 590, and the secondary dilution gas may be transferred to the particle counter through the discharge tube 590.

According to the present exemplary embodiment, the exhaust gas is mixed with the primary dilution air in the ejector unit 200 for performing the primary dilution and is mixed with the secondary dilution air in the dilution part 400 for performing the secondary dilution, thereby increasing the dilution ratio.

As described above, the primary dilution air supplied to the ejector unit 200 may be air of a high temperature of 150° C. to 250° C., and the primary dilution gas generated in the ejector unit 200 may be generated by the high temperature dilution method.

In addition, the secondary dilution air supplied to the dilution part 400 may be air at room temperature and may be supplied at a temperature of 10° C. to 30° C. The secondary dilution gas generated in the dilution part 400 may be generated by a room temperature dilution method.

Figure 4:
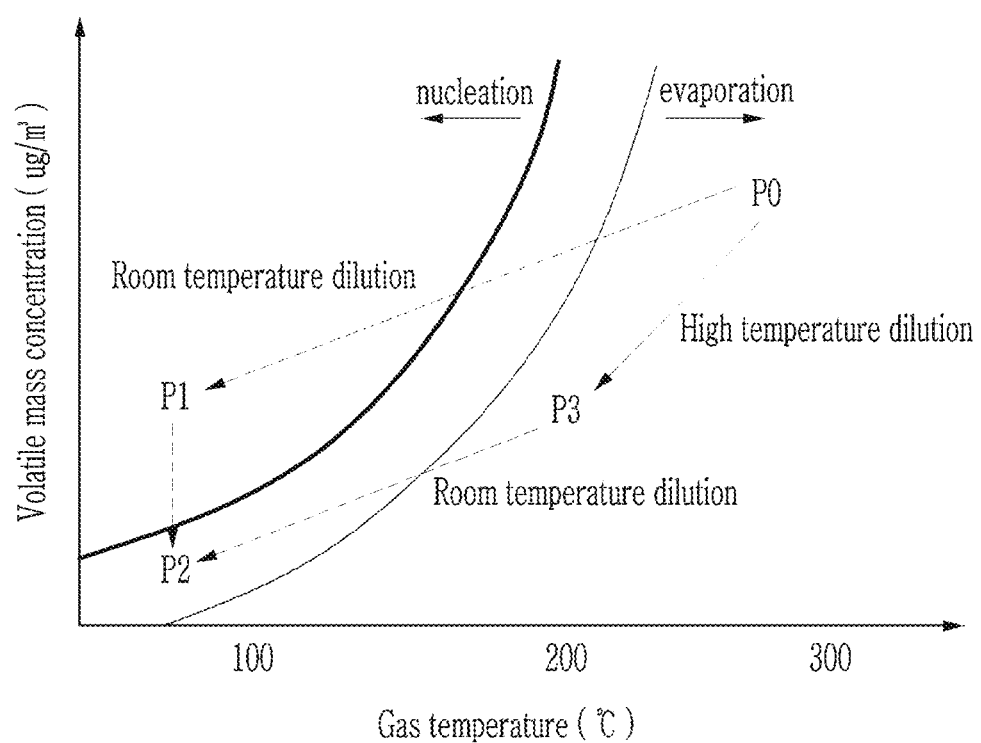
FIG. 4 is a graph to explain an effect depending on a dilution temperature in an exhaust gas dilution device according to a first exemplary embodiment of the present invention.

FIG. 4 is a graph to explain an effect depending on a dilution temperature in an exhaust gas dilution device according to a first exemplary embodiment of the present invention.

Referring to FIG. 4, the exhaust gas discharged from the nozzle part 300 is in a state P0 of a high temperature. If the primary dilution air mixed with the exhaust gas of a high temperature state is air at room temperature, that is, the exhaust gas of high temperature is diluted at room temperature, all of the moisture in the exhaust gas may be converted into liquid droplets. Accordingly, the primary diffusion gas in the first state P1 generated in the diffusion part 213 may include a large amount of liquid droplets. Also, when the primary dilution gas including a large amount of liquid droplets is mixed with the secondary dilution air at room temperature in the dilution part 400 to generate the secondary dilution gas of a second state P2, a large amount of liquid droplets are continuously included in the secondary dilution gas. Since such liquid droplets may be treated as particles during the measurement with the particle counter (not shown), it may cause deteriorated measurement accuracy.

However, according to the present invention, as the exhaust gas of a high temperature state P0 is mixed with the primary dilution air of a high temperature, that is, as the exhaust gas of a high temperature is diluted at a high temperature, the primary dilution gas generated in the diffusion part 213 may enter a third state P3, and moisture in the exhaust gas may be prevented from becoming liquid droplets. In addition, since it is mixed with the secondary dilution air at room temperature in the dilution part 400 to form the secondary dilution gas of the second state P2, the secondary dilution gas does not include liquid droplets or the amount of liquid droplets may be minimized, thereby the measurement accuracy of the particles may be improved.

Figure 5:
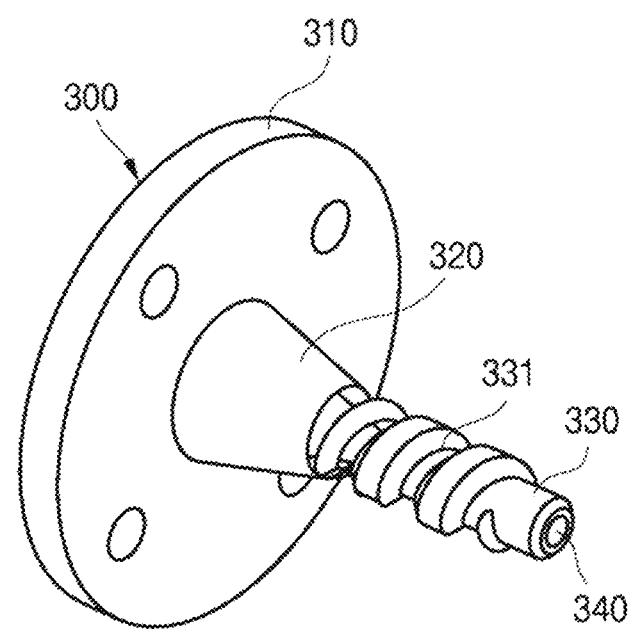
FIG. 5 is a perspective view showing a nozzle part of an exhaust gas dilution device according to a first exemplary embodiment of the present invention.
Figure 6:
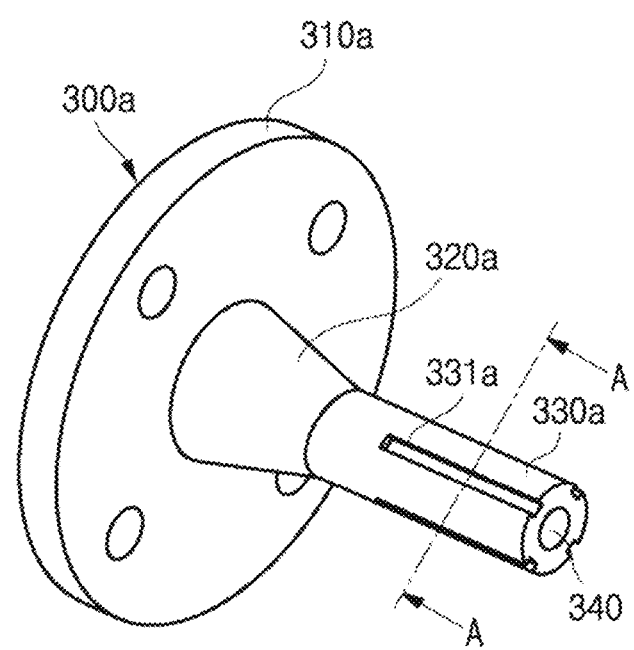
FIG. 6 is a perspective view showing another type of a nozzle part of an exhaust gas dilution device according to a first exemplary embodiment of the present invention.
Figure 7:
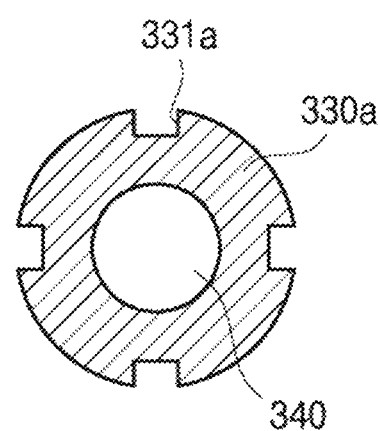
FIG. 7 is a cross-sectional view taken along a direction A-A of FIG. 6.

FIG. 5 is a perspective view showing a nozzle part of an exhaust gas dilution device according to a first exemplary embodiment of the present invention, FIG. 6 is a perspective view showing another type of a nozzle part of an exhaust gas dilution device according to a first exemplary embodiment of the present invention, and FIG. 7 is a cross-sectional view taken along a direction A-A of FIG. 6.

FIG. 5 shows that the first discharge flow path 331 formed on the external circumferential surface of the nozzle tip part 330 is formed in a spiral shape, and since this has been described above, the description thereof is omitted.

On the other hand, as shown in FIG. 6 and FIG. 7, a first discharge flow path 331a formed on the external circumferential surface of a nozzle tip part 330a may be formed to be extended in the axis direction of a nozzle tip part 330a, and the first discharge flow path 331a may be formed in plural with a predetermined interval along the circumferential direction of the nozzle tip part 330a.

Here, a flange part 310a, a connection part 320a, and the second discharge hole 340 of a nozzle part 300a may be the same as the flange part 310, the connection part 320, and the second discharge hole 340 shown in FIG. 5.

Figure 8:
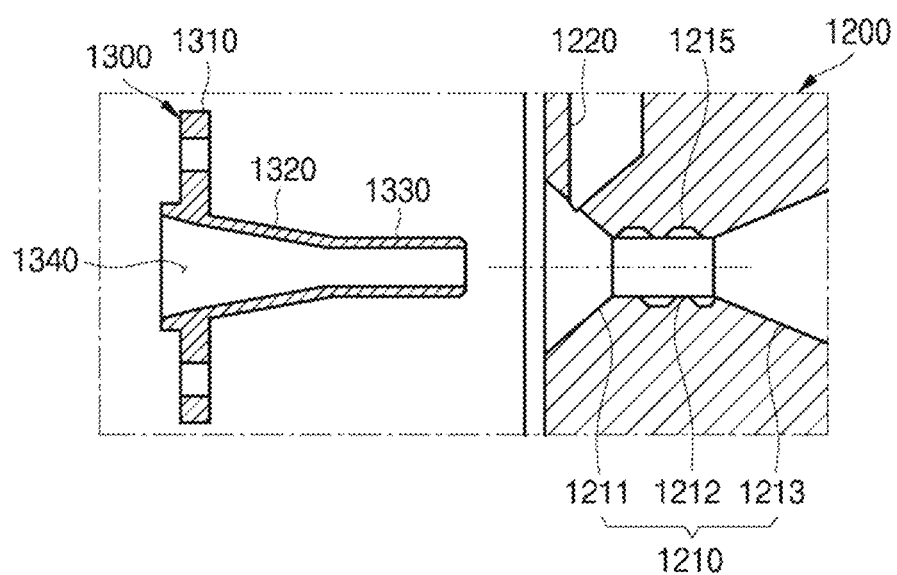
FIG. 8 is an exploded sectional view centrally showing a nozzle part of an exhaust gas dilution device according to a second exemplary embodiment of the present invention.
Figure 9:
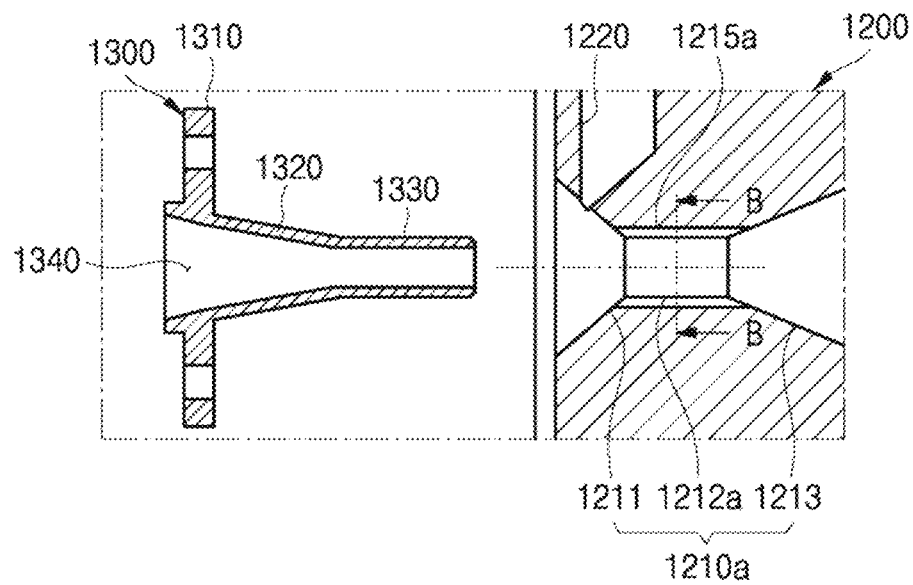
FIG. 9 is an exploded sectional view showing another type of a nozzle part of an exhaust gas dilution device according to a second exemplary embodiment of the present invention.
Figure 10:
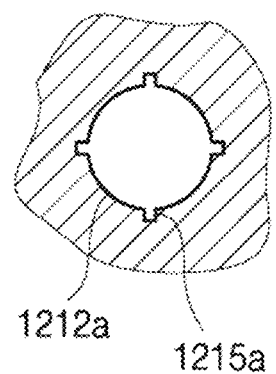
FIG. 10 is a cross-sectional view taken along a direction B-B of FIG. 9.

FIG. 8 is an exploded sectional view centrally showing a nozzle part of an exhaust gas dilution device according to a second exemplary embodiment of the present invention, FIG. 9 is an exploded sectional view showing another type of a nozzle part of an exhaust gas dilution device according to a second exemplary embodiment of the present invention, and FIG. 10 is a cross-sectional view taken along a direction B-B of FIG. 9. In the present exemplary embodiment, the first discharge flow path is not formed on the external circumferential surface of the nozzle tip part, but the first discharge flow path may be formed on the interior circumference of the acceleration part 212, and other configurations are the same as those of the above-described first exemplary embodiment and thus the repeated contents are omitted as much as possible.

First, as shown in FIG. 8, an acceleration part 1212 may have a second discharge flow path 1215 on the interior circumference. Here, the second discharge flow path 1215 may be such that it is spirally recessed on the interior circumference of the acceleration part 1212 (a form in which a concave groove is spirally recessed).

Further, a nozzle part 1300 may have a flange part 1310, a connection part 1320, and a nozzle tip part 1330, and a second discharge hole 1340 may be formed passing through the nozzle part 1300 in the axis direction. The nozzle tip part 1330 may be formed so that the exterior diameter corresponds to the interior diameter of the acceleration part 1212.

When the nozzle tip part 1330 is inserted into the acceleration part 1212, the primary dilution air flowed into a first inlet 1220 may be transferred from a suction part 1211 of a first discharge hole 1210 to a diffusion part 1213 through the second discharge flow path 1215.

On the other hand, as shown in FIG. 9 and FIG. 10, a second discharge flow path 1215a may be formed to be extended in the axis direction on the interior circumference of an acceleration part 1212a, and the second discharge flow path 1215a may be formed in plural with a predetermined interval along the circumferential direction of the acceleration part 1212a.

When the nozzle tip part 1330 is inserted into the acceleration part 1212a, the primary dilution air flowed into the first inlet 1220 may be moved from the suction part 1211 of a first discharge hole 1210a to the diffusion part 1213 through the second discharge flow path 1215a.

The description of the present invention is merely illustrative, and it will be understood by those skilled in the art that various changes in a specific form and details may be made therein without a change of the technical spirit or essential features of the present invention. Accordingly, it shall be understood that the exemplary embodiments described above are illustrative in all aspects, and are not limited. For example, each constituent element described in a singular form may be distributed and fed, and similarly, constituent elements described as being distributed may be fed in a combined form.

The scope of the present invention is represented by the claims, and it shall be construed that all of changes or modified forms derived from the meaning and the scope of the claims and equivalent concepts thereof are included in the scope of the present invention.

DESCRIPTION OF SYMBOLS

| | |
|---|---|
| 1: exhaust gas | 2: primary dilution air |
| 3: secondary dilution air | 100: head part |
| 200: ejector unit | 210: first discharge hole |
| 211: suction part | 212, 1212, 1212a: acceleration part |
| 213: diffusion part | 220: first inlet |
| 300, 300a, 1300: nozzle part | 330, 330a, 1330: nozzle tip part |
| 331, 331a: first discharge flow path | 400: dilution part |
| 410: first flow path part | 411: through hole |
| 420: second flow path part | 430: guide wall |
| 500: first adapter unit | 550: second adapter unit |
| 570: diffusion tube part | 580: plug part |
| 590: discharge tube | 1215, 1215a: second discharge flow path |

The invention claimed is:

1. An exhaust gas dilution device comprising:
a head part having a space part into which an exhaust gas flows and a through-hole passing through a center axis direction to be connected to the space part;
an ejector unit coupled to the head part and having a first discharge hole, the first discharge hole passing through the center axis direction, connected to the through-hole, and connected to a first inlet to which primary dilution air is supplied;
a nozzle part inserted into the first discharge hole through the through-hole, the nozzle part having a second discharge hole passing through the center axis direction so that the exhaust gas flowed into the space part is sucked in and ejected into the first discharge hole as the primary dilution air is moved through the first discharge hole; and
a dilution part having a first flow path part into which a primary dilution gas, which is generated and discharged after the exhaust gas and the primary dilution air are mixed in the first discharge hole, flows and a second flow path part connected to the first flow path part and configured to guide secondary dilution air to be mixed with the primary dilution gas and generate a secondary dilution gas as the primary dilution gas and the secondary dilution air are mixed,
wherein the first discharge hole has a suction part on a rear end of the ejector unit and connected to the first inlet and an acceleration part on a front end of the suction part and a diffusion part on a front end of the acceleration part, and
the nozzle part has a flange part coupled to an inner surface of the space part, a connection part connected to the flange part and being on the through-hole and an inside of the suction part, and a nozzle tip part being on the front end of the connection part and inserted into the acceleration part, the nozzle part having an exterior diameter corresponding to an interior diameter of the acceleration part.

2. The exhaust gas dilution device of claim 1, wherein the nozzle tip part has a first discharge flow path on an external circumferential surface so that the primary dilution air flowed to the suction part is discharged to the diffusion part.

3. The exhaust gas dilution device of claim 2, wherein the first discharge flow path is configured in a spiral shape.

4. The exhaust gas dilution device of claim 2, wherein the first discharge flow path is arranged in an axis direction of the nozzle tip part and includes a plurality of flow paths disposed at an interval along a circumferential direction of the nozzle tip part.

5. The exhaust gas dilution device of claim 1, wherein the acceleration part has a second discharge flow path on an interior circumference so that the primary dilution air flowed to the suction part is discharged to the diffusion part.

6. The exhaust gas dilution device of claim 5, wherein the second discharge flow path is configured in a spiral shape.

7. The exhaust gas dilution device of claim 5, wherein the second discharge flow path is arranged in an axis direction of the acceleration part and includes a plurality of flow paths disposed at an interval along a circumferential direction of the acceleration part.

8. The exhaust gas dilution device of claim 1, wherein the primary dilution air is supplied with a temperature of 150° C. to 250° C. so that the primary dilution gas is generated by a high temperature dilution method, and the secondary dilution air is supplied with a temperature of 10° C. to 30° C. so that the secondary dilution gas is generated by a room temperature dilution method.

9. The exhaust gas dilution device of claim 1, wherein the first flow path part includes a plurality of through holes through which the secondary dilution air passes.

* * * * *